United States Patent
Chamberlin et al.

(10) Patent No.: US 10,590,037 B2
(45) Date of Patent: Mar. 17, 2020

(54) LIQUID IMMERSION TECHNIQUES FOR IMPROVED RESISTANCE TO CONDUCTIVE ANODIC FILAMENT FORMATION

(71) Applicant: International Business Machines Corporation, Armonk, NY (US)

(72) Inventors: Bruce J. Chamberlin, Vestal, NY (US); Matthew S. Kelly, Oakville (CA); Scott B. King, Rochester, MN (US); Joseph Kuczynski, North Port, FL (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 15/470,138

(22) Filed: Mar. 27, 2017

(65) Prior Publication Data

US 2018/0273426 A1    Sep. 27, 2018

(51) Int. Cl.
C03C 25/1095 (2018.01)
C03C 25/16 (2006.01)
C03C 25/26 (2018.01)
D03D 1/00 (2006.01)
D03D 15/00 (2006.01)

(52) U.S. Cl.
CPC .......... *C03C 25/1095* (2013.01); *C03C 25/16* (2013.01); *C03C 25/26* (2013.01); *D03D 1/0082* (2013.01); *D03D 15/0011* (2013.01); *D10B 2101/06* (2013.01)

(58) Field of Classification Search
CPC ..... C03C 25/1095; C03C 25/16; C03C 25/26; D03D 15/0011; D03D 1/0082; D10B 2101/06; B29B 2017/0436; B29B 15/125; B29C 70/28; B05D 3/12; B05C 3/125

USPC ......................................................... 264/136
See application file for complete search history.

(56) References Cited

U.S. PATENT DOCUMENTS

| | | | |
|---|---|---|---|
| 2,067,220 A | 1/1937 | Whitehead | |
| 3,895,158 A | 7/1975 | Gause et al. | |
| 4,500,660 A | 2/1985 | Minamisawa et al. | |

(Continued)

FOREIGN PATENT DOCUMENTS

| CN | 200961174 Y | 10/2007 |
|---|---|---|
| CN | 103911861 B | 1/2016 |

(Continued)

OTHER PUBLICATIONS

Wallenberger, et al., "Glass Fibers", ASM Handbook, vol. 21: Composites, Constituent Materials Chapter, Dec. 2001, pp. 27-34, ASM International, Materials Park, OH, USA.

(Continued)

*Primary Examiner* — Matthew J Daniels
*Assistant Examiner* — Yunju Kim
(74) *Attorney, Agent, or Firm* — Jared L. Montanaro

(57) ABSTRACT

An immersion weaving system includes a first drum immersed in a first bath of a liquid. The first drum is configured to form a glass strand from individual glass filaments. The immersion weaving system also includes a second drum immersed in the first bath of the liquid. The second drum is configured to form a yarn spool from the glass strand. The immersion weaving system further includes a loom immersed in a second bath of the liquid. The loom is configured to form a void-free glass cloth.

15 Claims, 5 Drawing Sheets

(56) References Cited

U.S. PATENT DOCUMENTS

| | | | |
|---|---|---|---|
| 5,104,698 A * | 4/1992 | Hayashi | B05C 3/125 427/299 |
| 5,330,595 A | 7/1994 | Held | |
| 5,773,371 A | 6/1998 | Appelt et al. | |
| 5,919,525 A | 7/1999 | Appelt et al. | |
| 6,809,046 B2 | 10/2004 | Velpari et al. | |
| 7,144,472 B2 | 12/2006 | Sato et al. | |
| 7,220,453 B2 | 5/2007 | Nishimura et al. | |
| 8,974,888 B2 | 3/2015 | Balcome et al. | |
| 9,351,405 B2 | 5/2016 | Boday et al. | |
| 2002/0058140 A1 | 5/2002 | Dana et al. | |
| 2004/0180202 A1 | 9/2004 | Lawton et al. | |
| 2013/0061401 A1 * | 3/2013 | Boday | C03C 25/1095 8/115.51 |
| 2013/0280417 A1 | 10/2013 | Boday et al. | |
| 2015/0060115 A1 | 3/2015 | Lee et al. | |
| 2016/0368821 A1 * | 12/2016 | Czaplewski | C09C 1/3072 |
| 2018/0153042 A1 | 5/2018 | Chamberlin et al. | |

FOREIGN PATENT DOCUMENTS

| | | |
|---|---|---|
| CN | 105555021 A1 | 5/2016 |
| WO | 0168752 A1 | 9/2001 |
| WO | 0224592 A1 | 3/2002 |
| WO | WO-2010/097261 A1 | 9/2010 |
| WO | 2011107418 A1 | 9/2011 |
| WO | WO-2015/059162 A1 | 4/2015 |

OTHER PUBLICATIONS

Gardiner, "The making of glass fiber", Composites, Apr. 2009 [posted Mar. 25, 2009], CompsitesWorld.com (online), 6 pages, URL: www.compositesworld.com/articles/the-making-of-glass-fiber.

Wikipedia, "Surface tension of various liquids in dyn/cm against air", Data Table, from, "Surface Tension", Wikipedia.org (online), [accessed Nov. 29, 2016], 1 page, URL: en.wikipedia.org/wiki/Surface_tension.

Appendix P; List of IBM Patent or Applications Treated as Related, Jun. 14, 2017, 2 pages.

Morgan, *Developments in Glass Yarns and Fabric Constructions*, The PCB Magazine, Mar. 2014, pp. 78-88, IConnect007.com (online), URL: www.magazines007.com/pdf/PCB-Mar2014.pdf.

Chamberlin et al., "Glass Fiber Coatings for Improved Resistance to Conductive Anodic Filament Formation," U.S. Appl. No. 16/536,539, filed Aug. 8, 2019.

List of IBM Patents or Applications Treated as Related, Aug. 7, 2019, 2 pgs.

* cited by examiner

LIQUID IMMERSION TECHNIQUES FOR IMPROVED RESISTANCE TO CONDUCTIVE ANODIC FILAMENT FORMATION

BACKGROUND

In locations on printed circuit boards where there are sources of copper, an electrical bias, glass fiber, and moisture, there is the potential for conductive anodic filament (CAF) formation. One particular area of concern is a void located in a region in woven glass where adjacent fibers touch (also referred to as a "triple point"). During fabrication of a printed circuit board, resin may fail to penetrate the triple point, thereby creating the void that provides a potential path for CAF growth. Typically, conductive anodic filaments form at an interface where the glass fiber has delaminated from the resin or where a triple point extends into a plated through hole (PTH). This may create a path for water diffusion and subsequent copper precipitation, leading to CAF formation and potential catastrophic failure of the printed circuit board.

SUMMARY

According to an embodiment, an immersion weaving process is disclosed. The immersion weaving process includes immersing a first drum in a first bath of a pre-resin material, the first drum to form a glass strand from individual glass filaments. The immersion weaving process includes immersing a second drum in the first bath of the pre-resin material, the second drum to form a yarn spool from the glass strand. The immersion weaving process also includes immersing the yarn spool in a second bath of the pre-resin material. A loom is immersed in the second bath of the pre-resin material, and the immersion weaving process further includes utilizing the loom to perform an immersion weaving operation to form a void-free glass cloth.

According to another embodiment, an immersion weaving process is disclosed. The immersion weaving process includes immersing a first drum in a first bath of a low surface tension fluid, the first drum to form a glass strand from individual glass filaments. The immersion weaving process includes immersing a second drum in the first bath of the low surface tension fluid, the second drum to form a yarn spool from the glass strand. The immersion weaving process also includes immersing the yarn spool in a second bath of the low surface tension fluid. A loom is immersed in the second bath of the low surface tension fluid, and the immersion weaving process further includes utilizing the loom to perform an immersion weaving operation to form a woven glass cloth that is impregnated with the low surface tension fluid. The immersion weaving process also includes, during a pre-impregnated (prepreg) material manufacturing process, displacing the low surface tension fluid with a resin material to form a prepreg material that includes a void-free glass cloth.

According to another embodiment, an immersion weaving system is disclosed. The immersion weaving system includes a first drum immersed in a first bath of a liquid. The first drum is configured to form a glass strand from individual glass filaments. The immersion weaving system also includes a second drum immersed in the first bath of the liquid. The second drum is configured to form a yarn spool from the glass strand. The immersion weaving system further includes a loom immersed in a second bath of the liquid. The loom is configured to form a void-free glass cloth.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
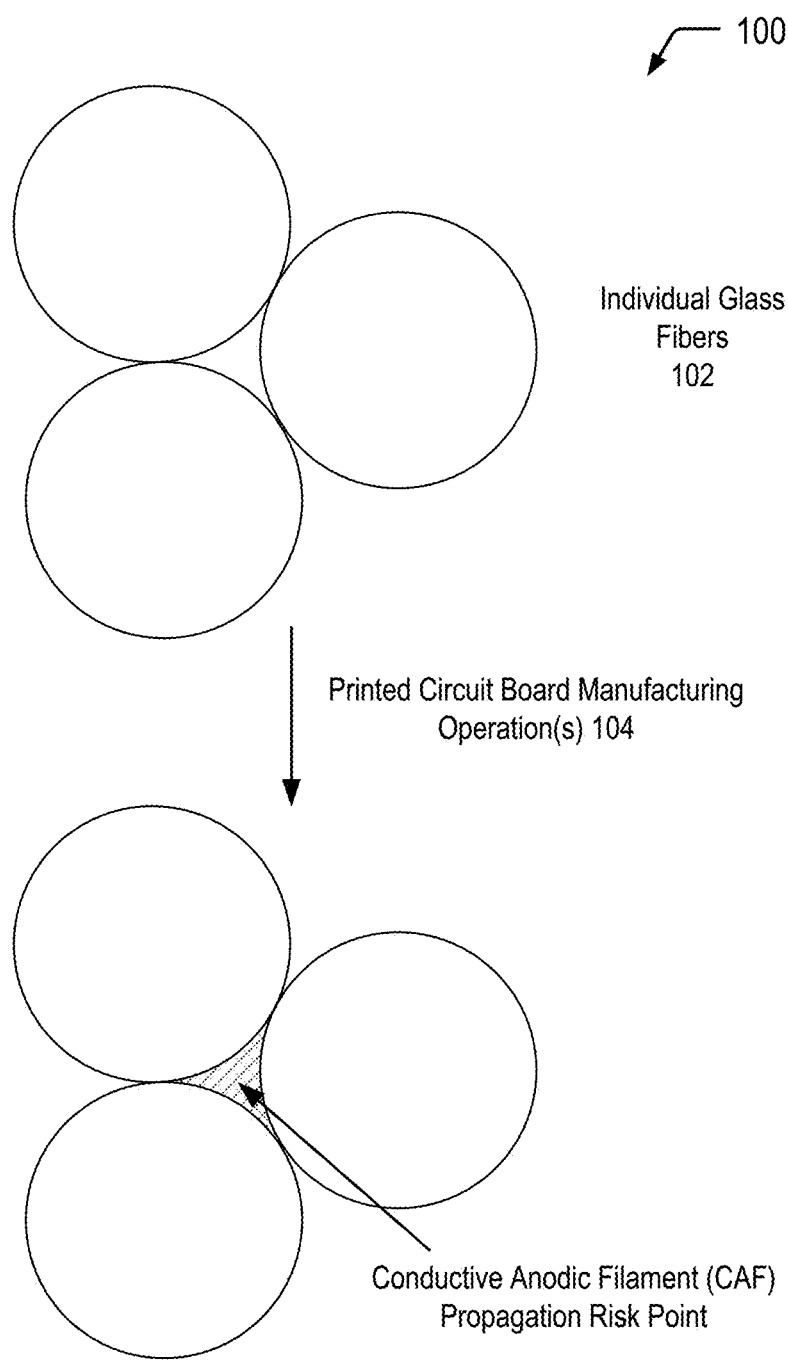
FIG. 1 is a prior art diagram depicting a void in a region between adjacent glass fibers that represents a CAF propagation risk point, according to one embodiment.

The present disclosure describes liquid immersion techniques for forming a void-free glass cloth by preventing glass fibers from being exposed to air during yarn formation and subsequent cloth weaving operations. During a conventional glass cloth manufacturing process, glass fibers are exposed to air during both the yarn manufacturing stage and the cloth weaving stage, resulting in the formation of air voids between adjacent fibers (also referred to herein as triple point locations) that represent potential paths for CAF growth when resin fails to fill such voids during fabrication of a printed circuit board. The liquid immersion techniques described herein may prevent the formation of such air voids between adjacent glass fibers, thereby reducing the risk of CAF formation and potential catastrophic failure of a printed circuit board that is formed from a woven glass cloth.

Manufacturing a pre-impregnated ("prepreg") material includes impregnating a glass cloth with a resin material (also referred to herein as a "prepreg resin") that is dissolved in a suitable solvent (e.g., acetone). As used herein, the term "pre-resin" is used to refer to a mixture that includes the prepreg resin and a larger fraction of solvent (compared to the solvent content of the prepreg resin) in order to decrease the viscosity and tackiness of the liquid resin. In the present disclosure, glass fibers, upon being drawn from bushings of a furnace, are rolled onto a drum that would typically be used to apply a sizing agent (also referred to as a "sizing drum"). In some embodiments of the present disclosure, the sizing agent may be replaced with a pre-resin material. In other embodiment of the present disclosure, the sizing agent may be replaced with a low surface tension fluid. The glass fibers may be rolled around the drum and into a bath that includes either the pre-resin material or the low surface tension fluid, within which the yarn-forming drums are also submerged. Thus, the glass fibers are not exposed to air during the yarn forming process, thereby preventing the formation of air voids.

When the sizing agent is replaced with the pre-resin material, the void-free glass cloths of the present disclosure may be formed from the wet yarn by weaving the cloth using a loom that is submerged in a bath containing the pre-resin material in order to prevent air from being entrapped in the weave. After leaving the loom, the cloth may be drawn through a series of drying ovens in order to lower the solvent content to a level that is suitable for subsequent prepreg manufacturing.

When the sizing agent is replaced with the low surface tension fluid, the void-free glass cloths of the present disclosure may be formed in two stages. In the first stage, the wet yarn is woven into a cloth in a bath containing the low surface tension fluid in order to prevent air from being entrapped in the weave. In the second stage, a prepreg manufacturer forms a prepreg material from the fluid-impregnated woven glass cloth. During the prepreg formation process, the prepreg resin displaces the low surface tension fluid to yield a prepreg material having a woven glass cloth that is free from air voids.

Referring to FIG. 1, a prior art diagram 100 depicts a conventional process of printed circuit board fabrication. In FIG. 1, individual glass fibers 102 are utilized to form a printed circuit board via one or more printed circuit board manufacturing operations 104. In the conventional process depicted in FIG. 1, resin is added after fibers, bundles, yarns, and cloths are formed, making resin penetration into small spaces difficult. As previously described herein, remaining voids have been shown to be starting points for subsequent CAF formation. FIG. 1 illustrates that, during fabrication of the printed circuit board, resin fails to penetrate the triple point thereby creating a void that provides a path for CAF growth (identified as a "CAF propagation risk point" in FIG. 1).

Figure 2:
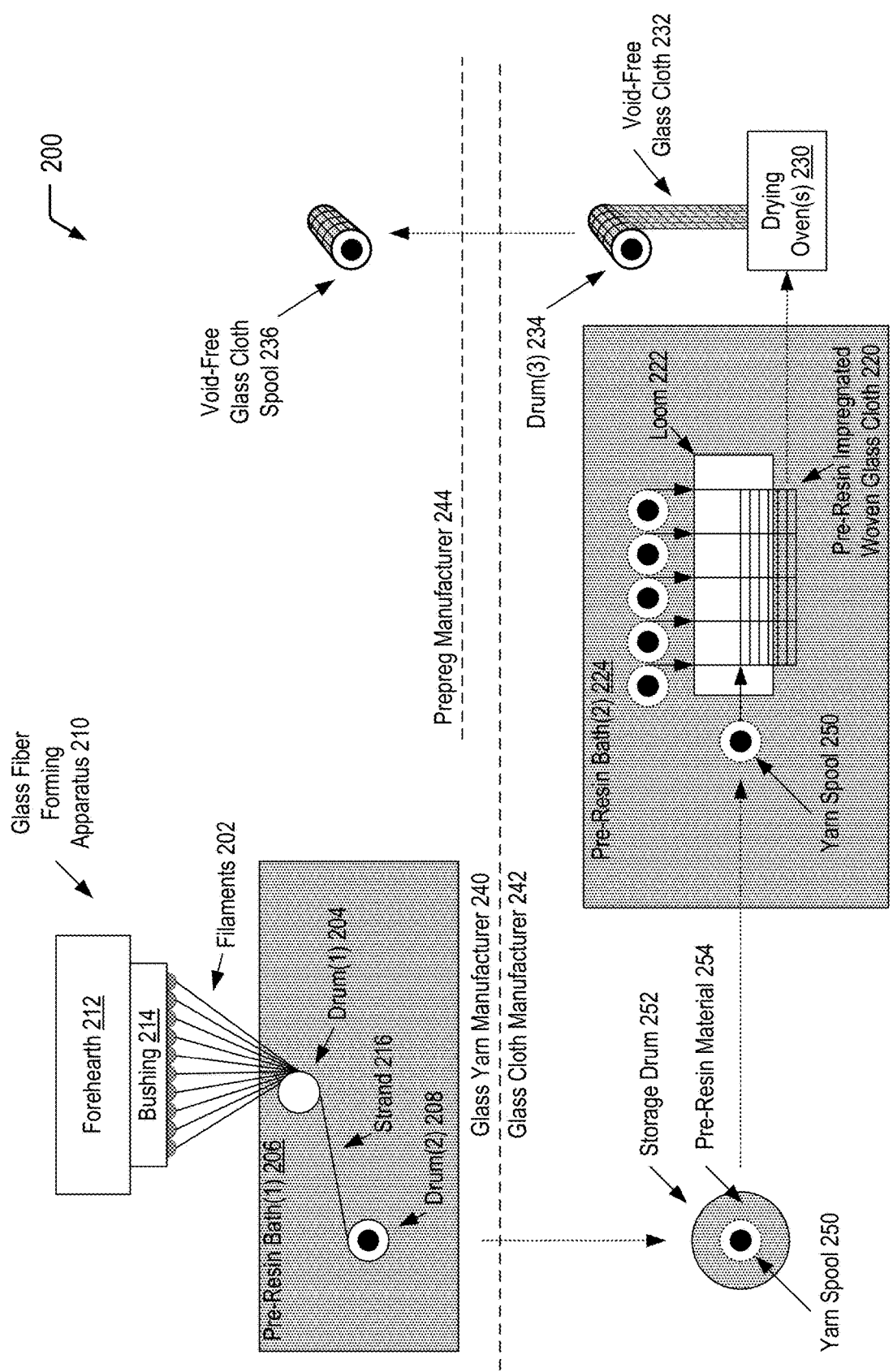
FIG. 2 is a diagram depicting a first embodiment of an immersion weaving system to form a void-free glass cloth for improved resistance to CAF formation.

Referring to FIG. 2, a diagram 200 illustrates an example of an immersion weaving system to form a void-free glass cloth for improved resistance to CAF formation, according to one embodiment. In the embodiment depicted in FIG. 2, a conventional sizing agent is replaced with a pre-resin material, and yarn forming and cloth weaving operations are performed using equipment that is submerged in the pre-resin material in order to prevent exposure to air. In FIG. 2, after exiting a furnace, glass filaments 202 may be rolled around a first drum 204 (identified as "Drum(1)" in FIG. 2) and into a bath 206 of pre-resin material (identified as "Pre-Resin Bath(1)" in FIG. 2), within which a second drum 208 that is used for yarn forming (identified as "Drum(2)" in FIG. 2) is also submerged. Subsequently, the wet yarn may be woven into a glass cloth 220 (identified as "Pre-Resin Impregnated Woven Glass Cloth" in FIG. 2) using a loom 222 that is submerged in a bath 224 of the pre-resin material (identified as "Pre-Resin Bath(2)" in FIG. 2). After leaving the loom 222, the glass cloth 220 may be drawn through one or more drying ovens 230 in order to lower the solvent content to a level that is suitable for subsequent prepreg manufacturing. As described further herein, the immersion weaving process depicted in FIG. 2 may yield a void-free glass cloth 232 without special sizing formulations and expensive bake procedures.

In the embodiment depicted in FIG. 2, selected portions of a glass fiber forming apparatus 210 are omitted for ease of illustration purposes only. The glass fiber forming apparatus 210 starts with raw materials, such as a dry mixture of silicas, limestone, clay, and boric acid. The raw materials pass-through measuring devices (not shown) that distribute the raw materials in the proper amounts or proportions. The raw materials then pass through a mixer (not shown), and the mixed raw materials are then dropped into a furnace. The furnace melts the raw materials to a temperature of between 1370° C. and 1540° C. to form a molten glass mixture. The molten glass mixture flows into a refiner (not shown) where the molten glass mixture cools to a temperature of between 1340° C. and 1425° C. The molten glass mixture homogenizes as it flows into the refiner. After the refiner, the molten glass mixture passes into a forehearth 212 where the molten glass mixture cools to a temperature of between 1260° C. and 1371° C.

The illustrated portion of the glass fiber forming apparatus 210 includes one bushing 214 arranged under the forehearth 212. In various embodiments, the glass fiber forming apparatus 210 can include an alternative number of bushings (e.g., three bushings). The bushing 214 includes nozzles (not shown) through which the molten glass can be extruded as individual glass filaments 202. The individual glass filaments 202 are drawn into the bath 206 of pre-resin material using the first drum 204 (that would normally be referred to as a "sizing drum" for application of a conventional sizing agent). The filaments 202 are gathered into a strand 216 before approaching the second drum 208. As the filaments 202 are immersed in the bath 206 of pre-resin material rather than being exposed to air during the yarn formation process depicted in FIG. 2, the yarn that is gathered on the second drum 208 does not include air voids that represent potential paths for CAF growth.

In the particular embodiment depicted in FIG. 2, dashed lines are used to delineate operations performed by a glass yarn manufacturer 240, a glass cloth manufacturer 242, and a prepreg manufacturer 244. It will be appreciated that the embodiment depicted in FIG. 2 is for illustrative purposes only and that alternative and/or additional entities may perform one or more of the individual operations described herein. As an example, in some cases, the glass yarn manufacturer 240 and the glass cloth manufacturer 242 may represent a single entity that performs both the yarn forming and glass cloth weaving operations.

In the embodiment depicted in FIG. 2, the bath 206 of pre-resin material includes a mixture that includes a prepreg resin (that is subsequently used by the prepreg manufacturer 244 to form a prepreg material) and a larger fraction of solvent (compared to the solvent content of the prepreg resin) in order to decrease the viscosity and tackiness of the liquid resin. As an illustrative, non-limiting example, the prepreg resin may include a first acetone solvent concentration. In this example, the bath 206 of pre-resin material includes a second acetone solvent content concentration. The second acetone solvent content concentration is significantly higher than the first acetone solvent concentration in order to decrease the viscosity and tackiness of the liquid resin during the yarn forming process.

In the particular embodiment depicted in FIG. 2, a yarn spool 250 that is gathered on the second drum 208 by the glass yarn manufacturer 240 may be stored in a storage drum 252 that is saturated with pre-resin material 254 of the same concentration that is used in the yarn formation process. In this way, the yarn spool 250 may be stored wet and, when sealed in the storage drum 252, is "shelf-stable" in the pre-resin material 254 (e.g., for transport to the glass cloth manufacturer 242). The yarn spool 250 that is stored in the storage drum 252 that is saturated with pre-resin material 254 represents an article of manufacture that enables the wet yarn to be stored for use by the same entity or a different entity for subsequent immersive glass cloth weaving operations.

FIG. 2 illustrates that the glass cloth manufacturer 242 may subsequently weave the wet yarn that is gathered on the yarn spool 250 into a glass cloth. In other cases, the glass yarn manufacturer 240 and the glass cloth manufacturer 242 may represent the same entity, and a single bath of pre-resin material may be used to perform the immersive yarn formation and immersive glass cloth formation operations described herein. In the example illustrated in FIG. 2, the yarn spool 250 (along with additional yarn spools formed in a similar manner via immersive yarn formation) may be immersed in the bath 224 of pre-resin material in which the loom 222 is submerged. In a particular embodiment, the loom 222 may correspond to a mechanical loom (e.g., that utilizes a bobbin to pull the yarn across), instead of an air jet loom that is typically utilized for glass cloth weaving. As the yarn spool 250 and the loom 222 are immersed in the bath 224 of pre-resin material rather than being exposed to air during the glass cloth weaving process depicted in FIG. 2, the woven glass cloth 220 does not include air voids that represent potential paths for CAF growth.

After leaving the loom 222, the woven glass cloth 220 may be drawn through the drying oven(s) 230 in order to lower the solvent content (e.g., the acetone content) to a level that is suitable for subsequent prepreg manufacturing by the prepreg manufacturer 244. While FIG. 2 illustrates an example in which a single drying oven is utilized, in some cases, the drying oven(s) 230 may include a series of drying ovens that are used to carefully reduce the solvent content to a satisfactory level to form a void-free glass cloth 232.

FIG. 2 further illustrates that, after satisfactory solvent content reduction using the drying oven(s) 230, the void-free glass cloth 232 may not be "tacky" enough to adhere to itself at room temperature. Accordingly, the void-free glass cloth 232 may be rolled onto a spool in a manner that is similar to typical practices for prepreg manufacturing. FIG. 2 illustrates an example in which the void-free glass cloth 232 is gathered using a third drum 234 (identified as "Drum(3)" in FIG. 2) to be shipped to the prepreg manufacturer 244 as a void-free glass cloth spool 236. The prepreg manufacturer 244 may subsequently utilize the void-free glass cloth spool 236 to form a prepreg material (not shown). As the void-free glass cloth 232 not exposed to air during yarn forming and cloth weaving operations, the resulting prepreg material does not include air voids where resin may fail to penetrate during fabrication of a printed circuit board by a printed circuit board manufacturer (not shown). Accordingly, fabricating a printed circuit board from the void-free glass cloth 232 that is formed according to the process described herein with respect to FIG. 2 may reduce the risk of CAF formation and potential catastrophic failure of the printed circuit board.

Thus, FIG. 2 illustrates an example of an immersion weaving system to form a void-free glass cloth for improved resistance to CAF formation. In contrast to FIG. 1, FIG. 2 illustrates the elimination of the CAF propagation risk point that is associated with an air void between adjacent glass fibers that may result from exposure to air during yarn forming and subsequent cloth weaving operations. Preventing the glass fibers from being exposed to air during yarn formation and subsequent cloth weaving operations eliminates the possibility of such air void formation, thereby reducing the risk of CAF formation and potential catastrophic failure of a printed circuit board.

Figure 3:
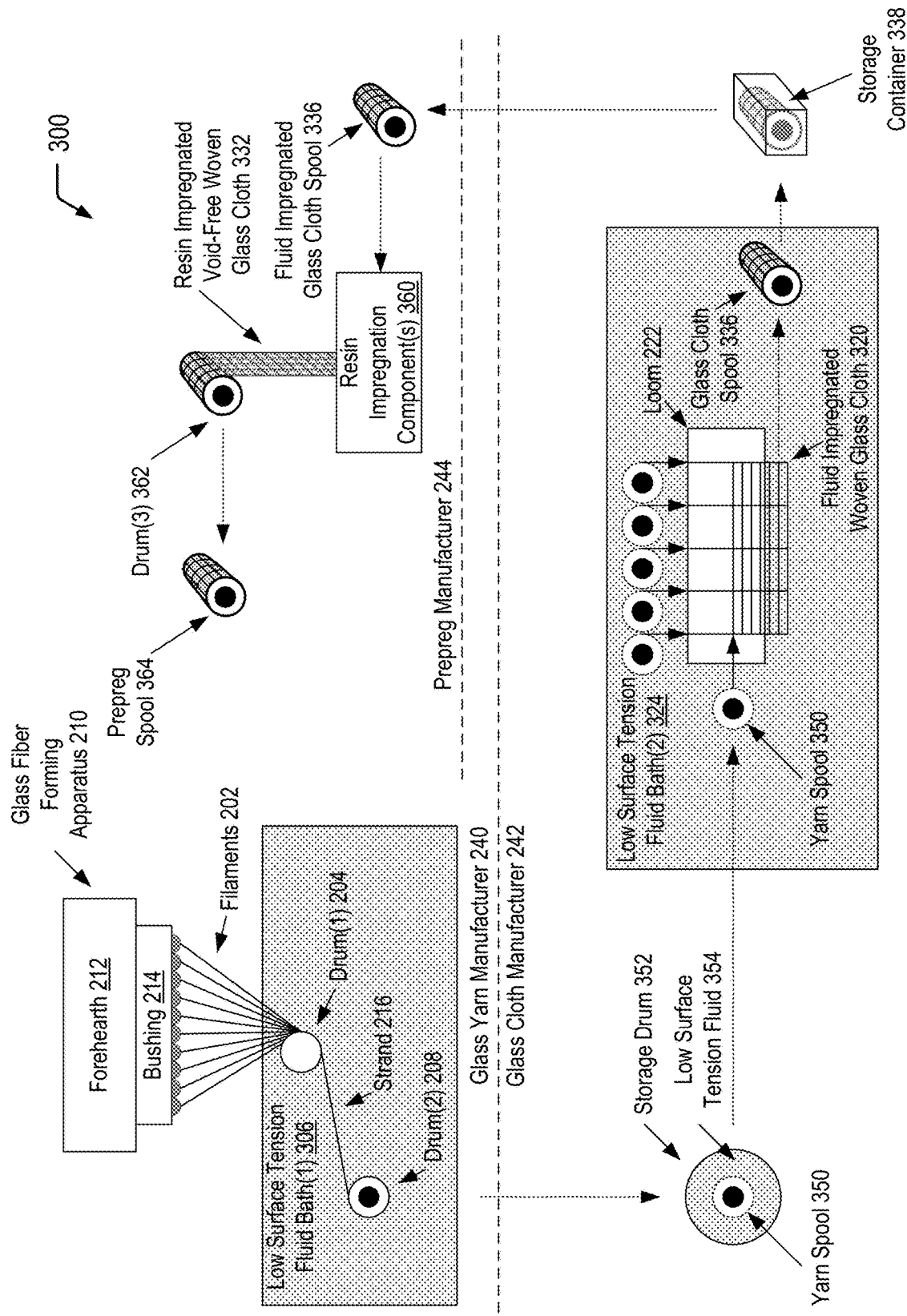
FIG. 3 is a diagram depicting a second embodiment of an immersion weaving system to form a void-free glass cloth for improved resistance to CAF formation.

Referring to FIG. 3, a diagram 300 illustrates an example of an immersion weaving system to form a void-free glass cloth for improved resistance to CAF formation, according to one embodiment. In the embodiment depicted in FIG. 3, a conventional sizing agent is replaced with a low surface tension fluid, and yarn forming and cloth weaving operations are performed using equipment that is submerged in the low surface tension fluid in order to prevent exposure to air. As described further herein, during a prepreg formation process performed by the prepreg manufacturer 244, a prepreg resin displaces the low surface tension fluid to yield a prepreg material 332 having a woven glass cloth that is free from air voids (identified as "Resin Impregnated Void-Free Woven Glass Cloth" in FIG. 3).

FIG. 3 illustrates that the individual glass filaments 202 may be drawn into a bath 306 of low surface tension fluid (identified as "Low Surface Tension Fluid Bath(1)" in FIG. 3) using the first drum 204. Illustrative, non-limiting examples of suitable low surface tension fluids include isopropanol (IPA), n-hexane, and acetone (among numerous other alternatives). To illustrate, IPA has a surface tension value of 21.70 dyn/cm against air at 20° C., n-hexane has a surface tension value of 18.40 dyn/cm against air at 20° C., and acetone has a surface tension value of 23.70 dyn/cm against air at 20° C.

As in the example of FIG. 2, the individual glass filaments 202 are gathered into the strand 216 before approaching the second drum 208. As the glass filaments 202 are immersed in the bath 306 of low surface tension fluid rather than being exposed to air during the yarn formation process depicted in FIG. 3, the yarn that is gathered on the second drum 208 does not include air voids that represent potential paths for CAF growth.

In the particular embodiment depicted in FIG. 3, dashed lines are used to delineate operations performed by the glass yarn manufacturer 240, the glass cloth manufacturer 242, and the prepreg manufacturer 244. It will be appreciated that the embodiment depicted in FIG. 3 is for illustrative purposes only and that alternative and/or additional entities may perform one or more of the individual operations described herein. As an example, in some cases, the glass yarn manufacturer 240 and the glass cloth manufacturer 242 may represent a single entity that performs both the yarn forming and glass cloth weaving operations.

In the particular embodiment depicted in FIG. 3, a yarn spool 350 that is gathered on the second drum 208 by the glass yarn manufacturer 240 may be stored in a storage drum 352 that is saturated with low surface tension fluid 354. In this way, the yarn spool 350 may be stored wet and, when sealed in the storage drum 352, is "shelf-stable" in the low surface tension fluid 354 (e.g., for transport to the glass cloth manufacturer 242). The yarn spool 350 that is stored in the storage drum 352 that is saturated with the low surface tension fluid 354 represents an article of manufacture that enables the wet yarn to be stored for use by the same entity or a different entity for subsequent immersive glass cloth weaving operations.

FIG. 3 illustrates that the glass cloth manufacturer 242 may subsequently weave the wet yarn that is gathered on the yarn spool 350 into a glass cloth. In other cases, the glass yarn manufacturer 240 and the glass cloth manufacturer 242 may represent the same entity, and a single bath of low surface tension fluid may be used to perform the immersive yarn formation and immersive glass cloth formation operations described herein. In the example illustrated in FIG. 3, the yarn spool 350 (along with additional yarn spools formed in a similar manner via immersive yarn formation) may be immersed in the bath 324 of low surface tension fluid in which the loom 222 is submerged. In a particular embodiment, the loom 222 may correspond to a mechanical loom (e.g., that utilizes a bobbin to pull the yarn across), instead of an air jet loom that is typically utilized for glass cloth weaving. As the yarn spool 350 and the loom 222 are immersed in the bath 324 of low surface tension fluid rather than being exposed to air during the glass cloth weaving process depicted in FIG. 3, the woven glass cloth 320 does not include air voids that represent potential paths for CAF growth.

In the embodiment depicted in FIG. 3, after leaving the loom 222, the woven glass cloth 320 may be rolled onto a glass cloth spool 336 using a drum (not shown) that is also immersed in the bath 324 of low surface tension fluid. In the particular embodiment depicted in FIG. 3, the glass cloth spool 336 may be stored in a storage container 338 (e.g., a metallized bag) in order to prevent solvent loss. In this way, the glass cloth spool 336 may be stored wet and, when sealed in the storage container 338, is "shelf-stable" (e.g., for transport to the prepreg manufacturer 244). The yarn spool 350 that is stored in the storage container 338 represents an article of manufacture that enables the wet glass cloth to be stored for use by the prepreg manufacturer 244 for subsequent formation of prepreg materials.

FIG. 3 illustrates that, during the prepreg formation process performed by the prepreg manufacturer 244, a prepreg resin displaces the low surface tension fluid in the woven glass cloth 320 to yield the prepreg material 332 that is free from air voids. The prepreg manufacturer 244 may utilize one or more resin impregnation components 360 to displace the low surface tension fluid impregnated in the woven glass cloth 320 with the prepreg resin. FIG. 3 illustrates an example in which the prepreg material 332 is gathered using a third drum 362 (identified as "Drum(3)" in FIG. 3) to form a prepreg spool 364. While not shown in the example of FIG. 3, a printed circuit board manufacturer may utilize the prepreg spool 364 to form a printed circuit board. The prepreg material 332 does not include air voids where resin may fail to penetrate during fabrication of the printed circuit board. Accordingly, the liquid immersion weaving process and subsequent displacement of the low surface tension fluid with prepreg resin depicted in FIG. 3 may reduce the risk of CAF formation and potential catastrophic failure of the printed circuit board.

Thus, FIG. 3 illustrates another example of an immersion weaving system to form a void-free glass cloth for improved resistance to CAF formation. In contrast to FIG. 1, FIG. 3 illustrates the elimination of the CAF propagation risk point that is associated with an air void between adjacent glass fibers that may result from exposure to air during yarn forming and subsequent cloth weaving operations. Preventing the glass fibers from being exposed to air during yarn formation and subsequent cloth weaving operations eliminates the possibility of such air void formation, thereby reducing the risk of CAF formation and potential catastrophic failure of a printed circuit board that is formed from the woven glass cloth of FIG. 3.

Figure 4:
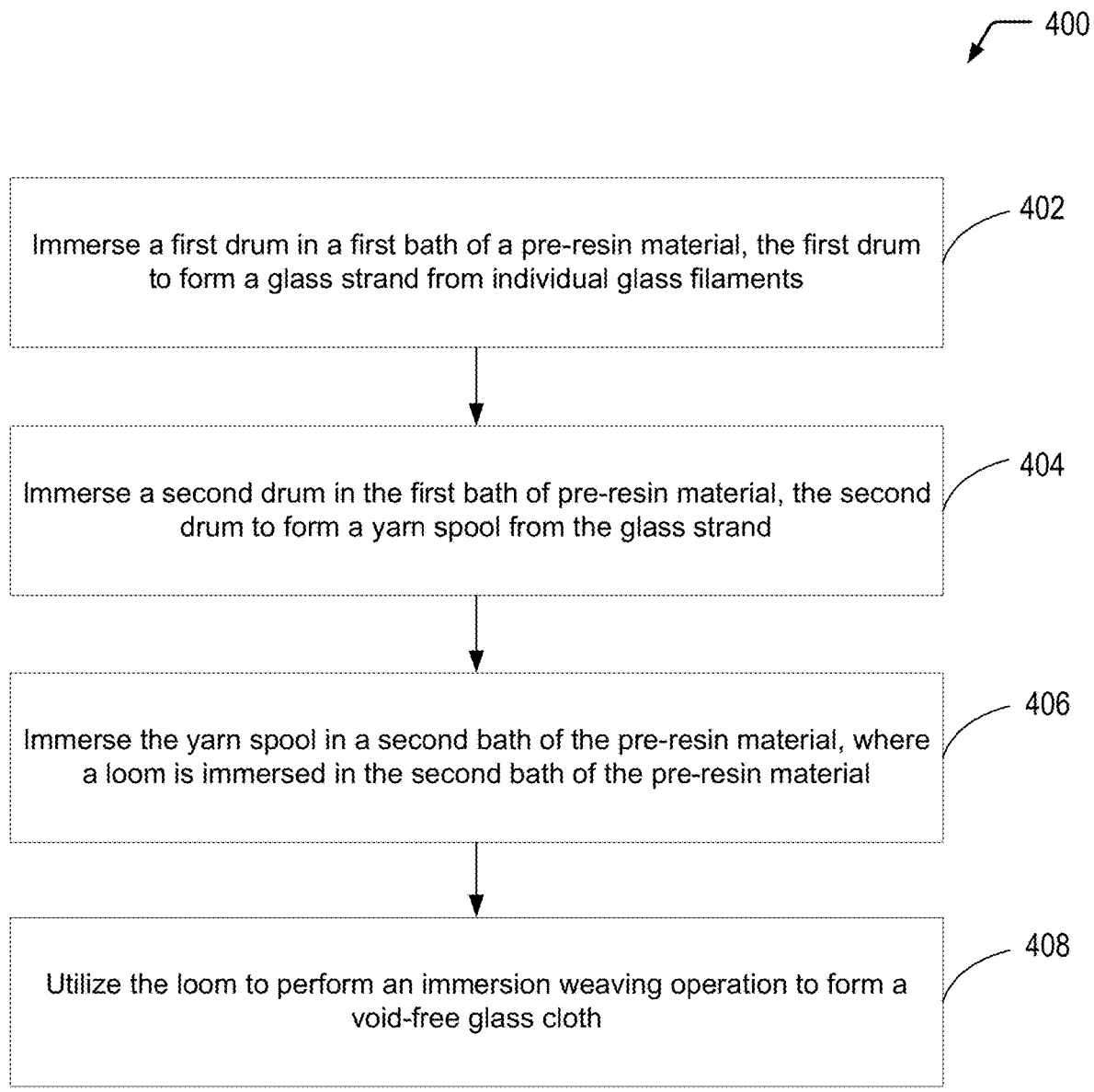
FIG. 4 is a flow diagram depicting a first embodiment of an immersion weaving process to form a void-free glass cloth for improved resistance to CAF formation.

Referring to FIG. 4, a flow diagram depicts an example of an immersion weaving process 400 to form a void-free glass cloth for improved resistance to CAF formation. In the particular embodiment illustrated in FIG. 4, operations associated with an example immersive yarn forming process are identified as operations 402 and 404, while operations associated with an immersive weaving process are identified as operations 406 and 408. It will be appreciated that the operations shown in FIG. 4 are for illustrative purposes only and that the operations may be performed in alternative orders, at alternative times, by a single entity or by multiple entities, or a combination thereof. As an example, a glass yarn manufacturer may perform the immersive yarn forming process, while a glass cloth manufacturer may perform the immersive weaving process.

The immersion weaving process 400 includes immersing a first drum in a first bath of a pre-resin material, at 402. The first drum is configured to form a glass strand from individual glass filaments. For example, referring to FIG. 2, the first drum 204 is immersed in the bath 206 of pre-resin material, and the individual glass filaments 202 are formed into a strand 216 using the first drum 204.

The immersion weaving process 400 includes immersing a second drum in the first bath of pre-resin material, at 404. The second drum is configured to form a yarn spool from the glass strand. For example, referring to FIG. 2, the second drum 208 is immersed in the bath 206 of pre-resin material, and the second drum 208 is used to form the yarn spool 250 from the strand 216.

The immersion weaving process 400 includes immersing the yarn spool in a second bath of the pre-resin material, at 406. A loom is immersed in the second bath of the pre-resin material. For example, referring to FIG. 2, the yarn spool 250 and the loom 222 are immersed in the bath 224 of the pre-resin material.

The immersion weaving process 400 also includes utilizing the loom to perform an immersion weaving operation to form a void-free glass cloth, at 408. For example, referring to FIG. 2, the loom 222 that is immersed in the bath 224 of pre-resin material may form the woven glass cloth 220 (that is impregnated with the pre-resin material).

Thus, FIG. 4 illustrates an example of an immersion weaving process to form a void-free glass cloth for improved resistance to CAF formation.

Figure 5:
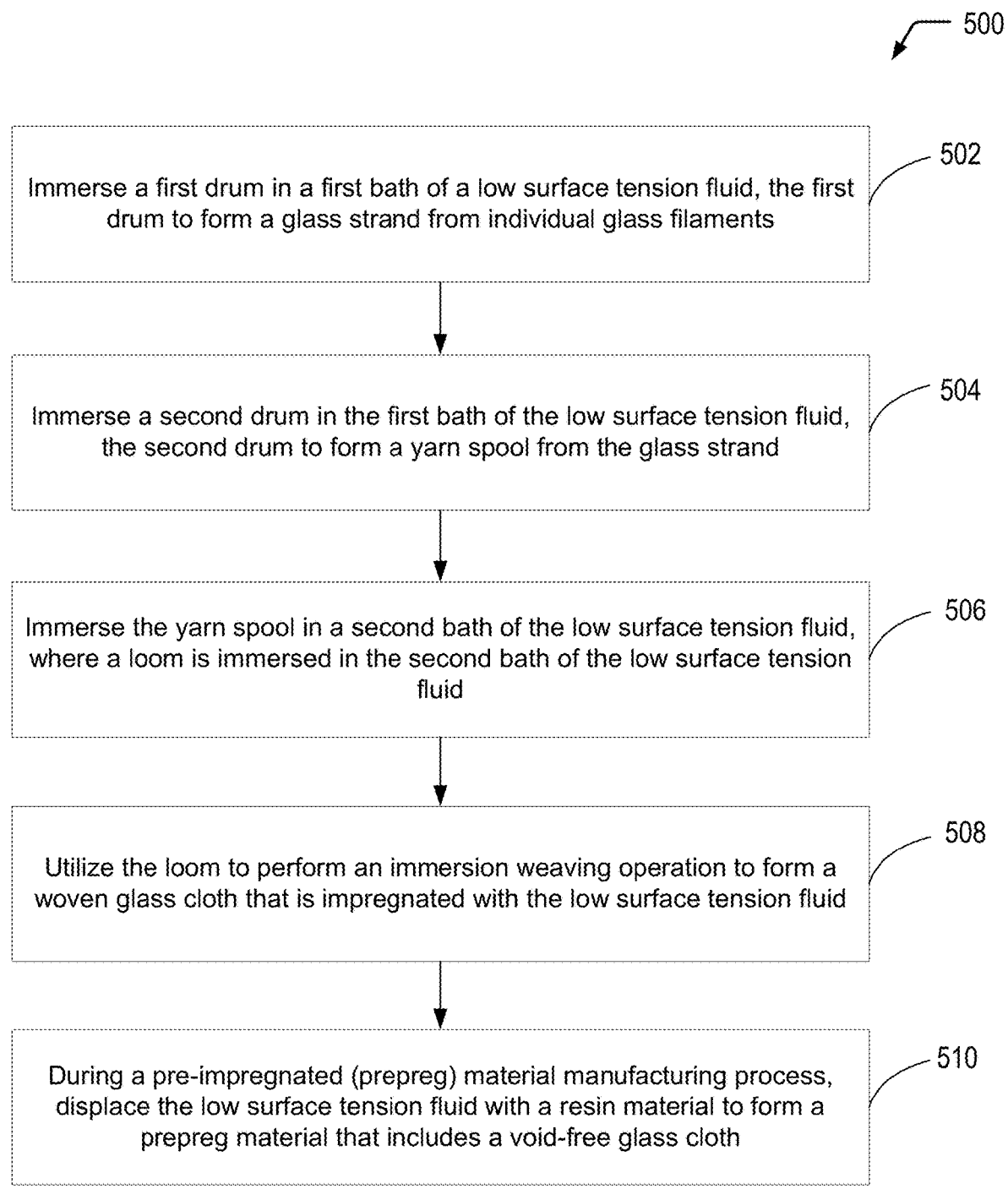
FIG. 5 is a flow diagram depicting a second embodiment of an immersion weaving process to form a void-free glass cloth for improved resistance to CAF formation.

Referring to FIG. 5, a flow diagram depicts another example of an immersion weaving process 500 to form a void-free glass cloth for improved resistance to CAF formation. In the particular embodiment illustrated in FIG. 5, operations associated with an example immersive yarn forming process are identified as operations 502 and 504, while operations associated with an immersive weaving process are identified as operations 506 and 508, while operations associated with forming a prepreg material that includes a void-free glass cloth are identified as operation 510. It will be appreciated that the operations shown in FIG. 5 are for illustrative purposes only and that the operations may be performed in alternative orders, at alternative times, by a single entity or by multiple entities, or a combination thereof. As an example, a glass yarn manufacturer may perform the immersive yarn forming process, while a glass cloth manufacturer may perform the immersive weaving process, while a prepreg manufacturer may form the prepreg material that includes the void-free glass cloth.

The immersion weaving process 500 includes immersing a first drum in a first bath of a low surface tension fluid, at 502. The first drum is configured to form a glass strand from individual glass filaments. For example, referring to FIG. 3, the first drum 204 is immersed in the bath 306 of low surface tension fluid, and the individual glass filaments 202 are formed into a strand 216 using the first drum 204.

The immersion weaving process 500 includes immersing a second drum in the first bath of low surface tension fluid, at 504. The second drum is configured to form a yarn spool from the glass strand. For example, referring to FIG. 3, the second drum 208 is immersed in the bath 206 of low surface tension fluid, and the second drum 208 is used to form the yarn spool 350 from the strand 216.

The immersion weaving process 500 includes immersing the yarn spool in a second bath of the low surface tension fluid, at 506. A loom is immersed in the second bath of the low surface tension fluid. For example, referring to FIG. 3, the yarn spool 350 and the loom 222 are immersed in the bath 324 of the low surface tension fluid.

The immersion weaving process 500 also includes utilizing the loom to perform an immersion weaving operation to form a woven glass cloth that is impregnated with the low surface tension fluid, at 508. For example, referring to FIG. 3, the loom 222 that is immersed in the bath 324 of low surface tension fluid may form the woven glass cloth 320 (that is impregnated with the low surface tension fluid).

The immersion weaving process 500 further includes displacing the low surface tension fluid with a resin material to form a prepreg material that includes a void-free glass cloth during a prepreg material manufacturing process, at 510. For example, referring to FIG. 3, the prepreg manufacturer 244 may utilize the fluid impregnated glass spool 336 received from the glass cloth manufacturer 242 to form the prepreg material 332 that includes the void-free glass cloth (identified as "Resin Impregnated Void-Free Woven Glass Cloth" in FIG. 3). The resin impregnation component(s) 360 may be used to displace the low surface tension fluid with the resin material.

Thus, FIG. 5 illustrates an example of an immersion weaving process to form a void-free glass cloth for improved resistance to CAF formation.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An immersion weaving process comprising:
   providing a glass filament forming apparatus and a first bath of a pre-resin material, wherein the first bath of the pre-resin material contains a first drum and a second drum;
   forming individual glass filaments;
   guiding the individual glass filaments over the first drum in the first bath of the pre-resin material to form a glass strand;
   winding the glass strand on the second drum to form a yarn spool;
   immersing the yarn spool in a second bath of the pre-resin material;
   removing the glass strand from the yarn spool in the second bath of the pre-resin material; and
   immersion weaving the glass strand on a loom immersed in the second bath of the pre-resin material to form a void-free glass cloth.

2. The immersion weaving process of claim 1, wherein the pre-resin material includes a resin material dissolved in a solvent.

3. The immersion weaving process of claim 2, wherein the resin material has a first solvent concentration, and wherein the pre-resin material has a second solvent concentration that is greater than the first solvent concentration.

4. The immersion weaving process of claim 2, wherein the solvent includes acetone.

5. The immersion weaving process of claim 1, further comprising storing the yarn spool in a storage drum that is saturated with the pre-resin material.

6. The immersion weaving process of claim 5, wherein a glass yarn manufacturer stores the yarn spool in the storage drum, and wherein a glass cloth manufacturer immerses the yarn spool in the second bath of the pre-resin material.

7. The immersion weaving process of claim 1, wherein the loom is a mechanical loom.

8. The immersion weaving process of claim 2, further comprising providing one or more drying ovens to reduce a solvent concentration to a level that is satisfactory for formation of a pre-impregnated (prepreg) material from the void-free glass cloth.

9. The immersion weaving process of claim 8, further comprising
   providing a third drum to form a void-free glass cloth spool to be utilized by a prepreg manufacturer to form the prepreg material.

10. An immersion weaving process comprising:
    providing a glass filament forming apparatus and a first bath of a low surface tension fluid, wherein the first bath of the low surface tension fluid contains a first drum and a second drum;
    forming individual glass filaments;
    guiding the individual glass filaments over the first drum in the first bath of the low surface tension fluid to form a glass strand;
    winding the glass stand on the second drum to form a yarn spool;
    immersing the yarn spool in a second bath of the low surface tension fluid;
    removing the glass strand from the yarn spool in the second bath of the low surface tension fluid;
    immersion weaving the glass strand on a loom immersed in the second bath of the low surface tension fluid to form a woven glass cloth, wherein the woven glass cloth is impregnated with the low surface tension fluid; and
    displacing the low surface tension fluid impregnated in the woven glass cloth with a resin material to form a pre-impregnated (prepreg) material, wherein the prepreg material includes the woven glass cloth as a void-free glass cloth.

11. The immersion weaving process of claim 10, wherein the low surface tension fluid includes isopropanol (IPA), n-hexane, or acetone.

12. The immersion weaving process of claim 10, further comprising providing a third drum that is immersed in the second bath of the low surface tension fluid to form a low surface tension fluid impregnated glass cloth spool from the woven glass cloth.

13. The immersion weaving process of claim 12, further comprising storing the low surface tension fluid impregnated glass cloth spool in a storage container to prevent loss of the low surface tension fluid.

14. The immersion weaving process of claim 13, further comprising providing the storage container to a prepreg manufacturer to form the prepreg material.

15. The immersion weaving process of claim 10, wherein the loom is a mechanical loom.

* * * * *